2,911,335

THIOPHOSPHATE ESTER FUNGICIDES

Everett E. Gilbert, Morris Township, Morris County, N.J., assignor to Allied Chemical Corporation, a corporation of New York No Drawing. Application September 27, 1955
Serial No. 537,033

9 Claims. (Cl. 167—22)

This invention relates to new thiophosphate esters useful for parasiticidal purposes and to the preparation of such compounds. These new thiophosphate esters conform to the general formula $$(RO)_2PSSSCCl_3$$

in which R represents an alkyl, substituted alkyl, aryl or substituted aryl radical.

In the new compounds typical examples of R are methyl, butyl, nonyl-phenyl, 2,4-dichlorophenyl, 2-chlorophenyl, 4-chlorophenyl, 2-phenylphenyl, 4-phenylphenyl, 2-cyclohexylphenyl, 2,4,5-trichlorophenyl, 2-phenyl-4-chlorophenyl, 4-phenyl-2-chlorophenyl, 2,2,2-trichloroethyl, 2-phenoxy-ethyl, α-naphtyl and β-naphthyl.

A thiophosphate ester of the general formula given above may be prepared by reacting a dithio acid phosphate of the general formula $$(RO)_2PSSH$$

in which R has the meaning given above, with perchloromethyl mercaptan ($Cl_3CSCl$).

The reaction between the dithio acid phosphates and perchloromethyl mercaptan takes place in accordance with the following equation:

$$(RO)_2PSSH + Cl_3CSCl \rightarrow (RO)_2PSSSCCl_3 + HCl$$

The dithio acid phosphates are well known compounds and may be produced by condensing alcohols or phenols (or naphthols) with phosphorus pentasulfide in accordance with the following equation:

$$4ROH + P_2S_5 \rightarrow 2(RO)_2PSSH + H_2S$$

High yields of the desired thiophosphate esters are obtained by carrying out the reaction in the presence of an inert solvent, preferably one lower boiling than the thiophosphate esters produced. Suitable inert solvents include benzene, xylene, naphtha and ethylene dichloride. When the reaction is completed, lower boiling solvents so used may be recovered for reuse by simple distillation at atmospheric or lower pressure.

During the reaction of dithio acid phosphates with perchloromethyl mercaptan, by-product hydrogen chloride gas evolves. This gas may be recovered during reaction by any convenient method as by absorption in a water trap.

The reaction of the present invention takes place at room temperature or at elevated temperatures up to about 70° C. or higher. Use of temperatures above 100° C. is not desirable because at such temperatures the dithio acid phosphates tend to lose hydrogen sulfide. The present process is preferably carried out by combining the reactants at slightly elevated temperature, as in the order of about 30° to 60° C., and for periods of time sufficient to complete the reaction, usually from about 1 to 5 hours.

The following examples are given for the purpose of illustrating the present invention but are not intended to be limiting on the scope thereof. In the examples parts are by weight and yields are percent of theory.

*Example 1.*—2,4-dichlorophenol was reacted with phosphorus pentasulfide to yield the dithio acid phosphate having the formula $(2,4Cl_2C_6H_3O)_2PSSH$. 42 parts of the dithio acid phosphate were dissolved in 100 parts of benzene. 19 parts of perchloromethyl mercaptan were then added, and the mixture was warmed gently on a steam bath maintained at about 60° C. Evolution of by-product hydrogen chloride gas was immediate. When the evolution of the gas was substantially complete, the benzene solvent was removed by distillation to yield 54 parts of a clear oil comprising the thiophosphate ester having the formula $(2,4Cl_2C_6H_3O)_2PSSSCCl_3$. The yield corresponded to about 95% based on either of the reactants.

*Example 2.*—Nonylphenol was reacted with phosphorus pentasulfide to yield the dithio acid phosphate having the formula $(C_9H_{19}C_6H_4O)_2PSSH$. 55 parts of the dithio acid phosphate were dissolved in 88 parts of benzene. 19 parts of perchloromethyl mercaptan were then added, and the mixture was warmed gently on a steam bath maintained at about 60° C. When evolution of hydrogen chloride gas was substantially complete, the solvent was removed by distillation to yield 68 parts of a clear oil comprising the thiophosphate ester having the formula $(C_9H_{19}C_6H_4O)_2PSSSCCl_3$. The yield corresponded to about 95% based on the perchloromethyl mercaptan.

*Example 3.*—N-butanol was reacted with phosphorus pentasulfide to yield the dithio acid phosphate having the formula $(C_4H_9O)_2PSSH$. 88 parts of the dithio acid phosphate were dissolved in 100 parts of benzene and reacted with 44 parts of perchloromethyl mercaptan. After evolution of hydrogen chloride gas was complete, the benzene solvent was removed by distillation to yield 100 parts of a clear oil comprising the thiophosphate ester having the formula $(C_4H_9O)_2PSSSCCl_3$. This yield corresponded to about 75% based on the perchloromethyl mercaptan.

Products of the type produced by the present invention find valuable application as parasiticides and particularly as protectants of organic materials against attack by fungi. The compounds may be mixed, if desired, with carriers which may be solids, liquids or gases. For instance, solids such as various clays, talcs, diatomaceous earths, etc., may be used. Liquid carriers may be, for example, xylene or methylated naphthalenes. Gaseous carriers may be air, nitrogen, carbon dioxide, etc.

Fungicidal properties of certain thiophosphate esters typical of those embraced within the scope of this invention are indicated in the following examples:

*Example 4.*—1% acetone solutions of the thiophosphate ester prepared in Example 3 were diluted with water, and the resultant solutions were tested in standard spore germination tests against *Sclerotinia fructicola* and also against *Stemphylium sarcinaeforme*. Complete control of both organisms was obtained at as low a dosage of thiophosphate ester as 1.0 part per million.

*Example 5.*—1% acetone solutions of the thiophosphate ester prepared in Example 1 were diluted with water, and the resultant solutions were tested as protectants against apple scab. Excellent control of the scab was obtained, and no leaf injury was observed at thiophosphate ester dosage of 1000 parts per million.

Products of this invention may also be employed as additives for petroleum lubricants to improve their operation under conditions of extreme pressure.

Since various changes and modifications may be made in the invention without departing from the spirit thereof, the invention is to be deemed as limited only by the scope of the appended claims.

I claim:
1. A method of protecting plants against attack by fungi which comprises applying to the plants a thiophosphate ester of the general formula $$(RO)_2PSSSCCl_3$$

in which R is a member of the group consisting of lower alkyl, chloro-substituted lower alkyl, phenoxy-substituted lower alkyl, alkyl-substituted phenyl, chloro-substituted phenyl, phenyl-substituted phenyl, cyclohexyl-substituted phenyl, phenylchloro-substituted phenyl and naphthyl radicals.

2. A method of protecting plants against attack by fungi which comprises applying to the plants a thiophosphate ester of the general formula $$(RO)_2PSSSCCl_3$$

in which R represents a cyclohexyl-substituted phenyl radical.

3. A method of protecting plants against attack by fungi which comprises applying to the plants a thiophosphate ester of the general formula $$(RO)_2PSSSCCl_3$$

in which R represents a chloro-substituted phenyl radical.

4. A method of protecting plants against attack by fungi which comprises applying to the plants a thiophosphate ester of the general formula $$(RO)_2PSSSCCl_3$$

in which R represents a phenyl-substituted phenyl radical.

5. A method of protecting plants against attack by fungi which comprises applying to the plants the thiophosphate ester having the formula $$(2\text{-}C_6H_5C_6H_4O)_2PSSSCCl_3$$

6. A method of protecting plants against attack by fungi which comprises applying to the plants the thiophosphate ester having the formula $$(2\text{-}C_6H_{11}C_6H_4O)_2PSSSCCl_3$$

7. A method of protecting plants against attack by fungi which comprises applying to the plants a thiophosphate ester of the general formula $$(RO)_2PSSSCCl_3$$

in which R represents a lower alkyl radical.

8. A method of protecting plants against attack by fungi which comprises applying to the plants the thiophosphate ester having the formula $$(C_4H_9O)_2PSSSCCl_3$$

9. A method of protecting plants against attack by fungi which comprises applying to the plants the thiophosphate ester having the formula $$(2,4Cl_2C_6H_3O)_2PSSSCCl_3$$

References Cited in the file of this patent

UNITED STATES PATENTS

| | | |
|---|---|---|
| 1,921,364 | Lommel | Aug. 8, 1933 |
| 2,335,953 | McCracken et al. | Dec. 7, 1943 |
| 2,489,917 | McCombie | Nov. 29, 1949 |
| 2,494,126 | Hoegberg | Jan. 10, 1950 |
| 2,494,283 | Cassaday | Jan. 10, 1950 |
| 2,494,284 | Cassaday | Jan. 10, 1950 |
| 2,520,393 | Fletcher | Aug. 29, 1950 |
| 2,544,858 | Hurt | Mar. 13, 1951 |
| 2,574,516 | Walter | Nov. 13, 1951 |
| 2,578,652 | Cassaday | Dec. 18, 1951 |
| 2,579,810 | Fields | Dec. 25, 1951 |
| 2,611,728 | Bartlett | Sept. 23, 1952 |
| 2,690,450 | Gilbert et al. | Sept. 28, 1954 |
| 2,698,820 | Newcomer | Jan. 4, 1955 |
| 2,818,364 | Birum | Dec. 31, 1957 |